Patented Feb. 20, 1945

2,369,891

UNITED STATES PATENT OFFICE 2,369,891

PROCESS FOR TREATING CITRUS FRUIT

Herbert Edward Greenlaw, Auburndale, Fla.

No Drawing. Application April 11, 1944,
Serial No. 530,563

3 Claims. (Cl. 99—105)

This invention relates to a process for treating citrus fruit, and more particularly to a process for removing the volatile oils from the peel of the citrus fruit preliminary to cutting and squeezing the fruit in the manufacture of fruit juices.

The volatile oils present in the peels of citrus fruit such as oranges and grapefruit are highly objectionable in the juice of such fruits and the presence of even a relatively small amount of the peel oil seriously lowers the quality of the fruit juice.

The problem of handling citrus fruit on a commercial scale for the preparation of a high-grade fruit juice has led to various approaches to this problem, but without substantial success.

I have found that the exposure of the citrus fruits to direct contact with flame for a limited period within a range of thirty seconds to one minute, while the fruit is rolled or moved so that all portions of the surface of the peel will be brought in direct contact with the flame, results in an explosive reaction with resultant charring of the fruit peel but without raising the temperature of the fruit pulp unduly, so that when the charred peel is subsequently removed by grating or hard scraping and the remaining peel and fruit cut and pressed, the resultant fruit juice is of a high quality and with no suggestion of the peel oils.

The exact time of exposure of the fruit to the direct flame and the intensity of the flame can be readily regulated to produce the desired charring of the fruit peel and any desirable apparatus for directing the flame on the fruit and rotating the fruit during exposure to the flame can be utilized.

Having thus fully described my invention, I claim:

1. Process of treating citrus fruit which consists in exposing the fruit to flame to char the outer skin and eliminate the oils from the skin and removing the skin.

2. Process of treating citrus fruit which consists in directing a flame to all parts of the surfaces of the fruit for a period within the range between thirty and sixty seconds to char the outer skin and eliminate the oils from the skin and removing the skin.

3. Process of extracting the juices of citrus fruit which consists in exposing the surface of the fruit to direct flames to char the surface and eliminate all oils from the skin abrading the char from the fruit and cutting and squeezing the remaining skin and fruit.

HERBERT EDWARD GREENLAW.